United States Patent [19]

Sully

[11] 4,189,248
[45] Feb. 19, 1980

[54] SNAP-ON-HANDLE STRUCTURE

[75] Inventor: George R. Sully, Waseca, Minn.

[73] Assignee: Truth Incorporated, Owatonna, Minn.

[21] Appl. No.: 863,470

[22] Filed: Dec. 22, 1977

[51] Int. Cl.² .............................................. F16D 1/06
[52] U.S. Cl. ..................................... 403/11; 403/330;
403/359; 292/353; 16/118; 74/553
[58] Field of Search ................. 74/543, 545, 548, 553;
403/11, 329, 359, 330, 361; 292/353; 16/121,
118; 279/79, 77

[56] References Cited

U.S. PATENT DOCUMENTS

| | | | |
|---|---|---|---|
| 191,363 | 5/1877 | Naylor | 292/353 |
| 1,882,625 | 10/1932 | Jacobi | 292/353 |
| 1,909,353 | 5/1933 | Hughes et al. | 74/543 UX |
| 2,271,266 | 1/1942 | Kost | 403/355 |
| 3,222,951 | 12/1965 | Maursey | 403/359 X |

FOREIGN PATENT DOCUMENTS

| | | | |
|---|---|---|---|
| 63694 | 7/1892 | Fed. Rep. of Germany | 279/79 |
| 213073 | 5/1967 | Sweden | 403/329 |

*Primary Examiner*—Andrew V. Kundrat
*Attorney, Agent, or Firm*—Wegner, Stellman, McCord, Wiles & Wood

[57] ABSTRACT

A snap-on handle structure for attachment to an operating shaft having detent notches and cam members including a handle with an internal recess, and a generally U-shaped spring member in the handle recess with a pair of spaced-apart arms with free ends extending toward an open end of the recess. Each of the arms has a generally V-shaped hook portion intermediate the central base of the spring member and the free ends of said legs with a pair of inclined legs to coact with the cam members on placement of the handle on the operating shaft and coaction with the detent notches for retention of the handle on the shaft.

5 Claims, 6 Drawing Figures

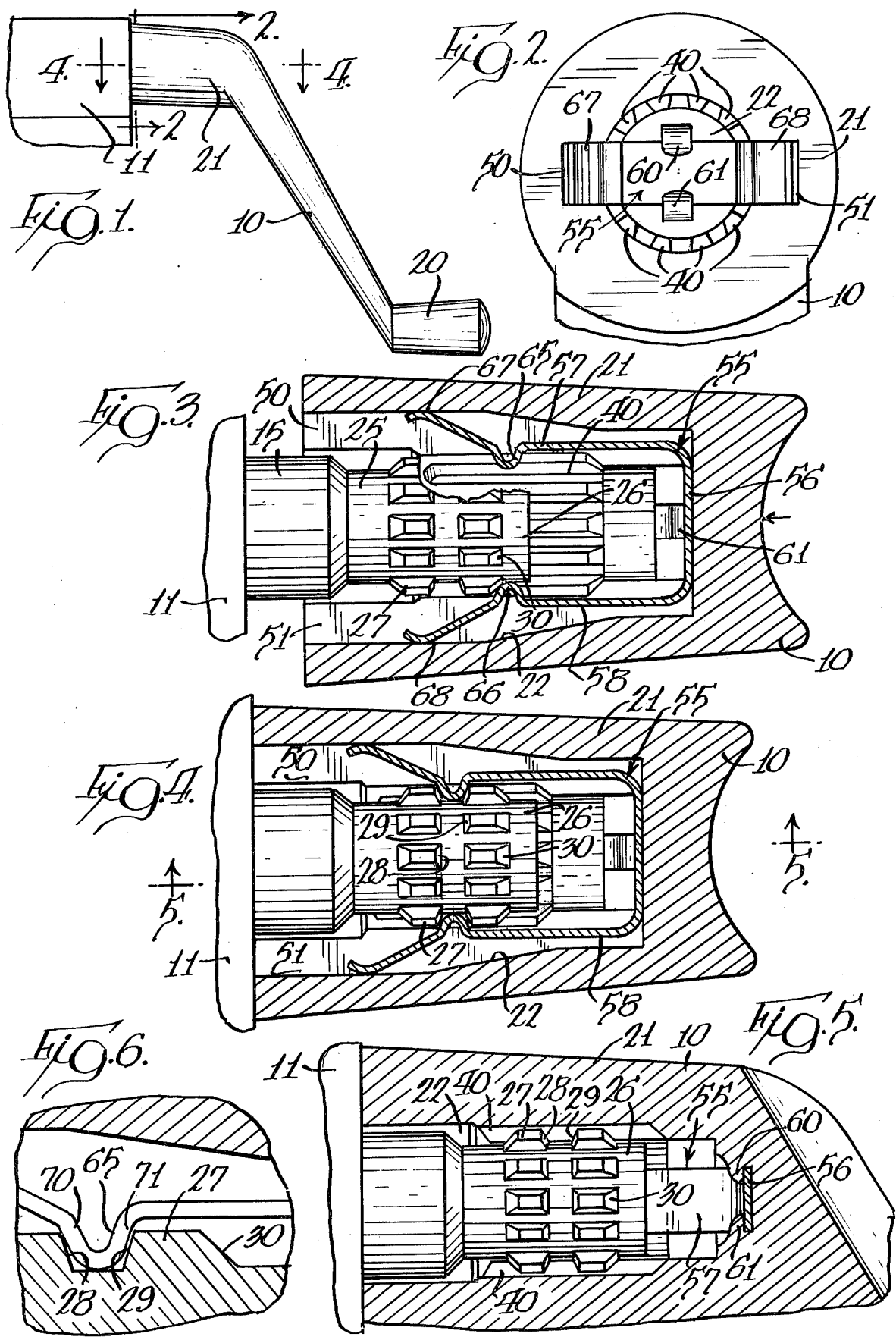

SNAP-ON-HANDLE STRUCTURE

BACKGROUND OF THE INVENTION

This invention pertains to snap-on handle structures which may be easily positioned on an operating shaft and removably retained thereon without the use of fastening devices, such as a set screw.

There are many devices including a rotatable handle and frequently the handle is separable from an operating shaft and is attached thereto with a set screw carried by the handle. This type of structure is commonly found in hardware used with casement and awning-type windows whereby rotational motion generated by the handle is used for opening and closing of the windows. The use of a set screw has several deficiencies including the frequent need to tighten the set screw when it works loose, the possible marring of the handle finish when using a tool to tighten the set screw, and the additional manufacturing operations required in machining the handle to receive the set screw as well as the additional installation time.

It is also known to attach a separable handle to an operating shaft by means of a retention device, such as a spring, which will engage in a detent opening in the operating shaft or be positioned to bite into the material of the mounting shaft for locking the handle to the operating shaft. Such structures result in attachment of the handle to the operating shaft in a manner which only permits destruction of the parts if it ever becomes necessary to remove the handle from the operating shaft.

SUMMARY OF THE INVENTION

A primary feature of the invention disclosed herein is to provide a snap-on handle structure wherein the handle and an operating shaft are related with spring structure for releasably holding the handle on the shaft and have structure for making a torque-transmitting connection therebetween.

An object of the invention is to provide a snap-on handle structure having a spring member which can move into engagement with a detent notch on the operating shaft and with there being splines interengaging between the handle and shaft to form the torque-transmitting connection, with the result that torque is not applied to the spring during operation of the handle. Additionally, the splines are related to have initial interengagement therebetween as the handle is placed on the operating shaft prior to active interengagement between the spring member and the shaft whereby the handle may be easily placed upon the shaft in one continuous motion.

Still another object of the invention is to provide a snap-on handle structure, with the handle having an internal recess to receive the operating shaft and the operating shaft having an aligned detent notch and cam member with the cam member facing the end of the operating shaft, a spring member mounted within the recess of the handle and having a generally V-shaped hook portion with a pair of inclined legs with one leg operable to engage the cam member for flexing of the spring member as it advances toward the detent notch and with the other leg of the hook portion engaging in the detent notch to retain the handle on the operating shaft.

A further object of the invention is to provide a handle structure as defined in the preceding paragraph wherein there are a series of said detent notches and cam members and with the spring member being of a generally U-shape with a pair of arms, each having one of said hook portions whereby there are two locations of engagement between the legs of the hook portions and the detent notches. Additionally, the arms of the spring member have free ends extending beyond said hook portions and which are positioned to engage the wall of said handle recess to assist in resisting forces which would tend to force the hook portions out of the detent notches.

Still another object of the invention is to provide a snap-on handle structure as defined in the preceding paragraph wherein the shaft and handle recess have splines for interengagement to form a torque transmitting connection and with the leading ends of the splines in the handle recess extending to a position beyond said hook portions and closer to the open end of the recess whereby the splines may be aligned and initially interengaged prior to engagement of said hook portions with the cam members during advance of the handle onto the operating shaft.

BRIEF DESCRIPTION OF THE DRAWING

FIG. 1 is a fragmentary side elevational view of the handle structure;

FIG. 2 is a fragmentary vertical end view of the handle, taken generally along the line 2—2 and on an enlarged scale and with the operating shaft not shown;

FIG. 3 is a view, similar to FIG. 4, showing the handle in an intermediate assembly position relative to an operating shaft;

FIG. 4 is a plan section, on an enlarged scale, taken generally along the line 4—4 in FIG. 1 and showing the handle in assembled position.

FIG. 5 is a sectional view, taken generally along the line 5—5 in FIG. 4; and

FIG. 6 is a fragmentary enlarged view of a part of the operating shaft and handle to show the interengaging relation therebetween.

DESCRIPTION OF THE PREFERRED EMBODIMENT

The snap-on handle structure is shown generally in FIG. 1 wherein a handle 10 is rotatably associated with operating hardware housed within a casing, shown fragmentarily at 11. An operating shaft 15 (FIG. 3) extends outwardly of the casing for connection to the handle 10. The handle 10 has a manually engageable member, such as a knob 20, at one end and, at the other end, has a mounting section 21 formed with a generally cylindrical internal recess 22 for placement onto the operating shaft 15 in assembling the handle thereto.

The operating shaft 15 has a reduced diameter section 25, with a free end 26 and which is provided with a series of elongate splines 27 extending lengthwise thereof to a position short of the free end 26. These splines are discontinuous to form a series of detent notches having opposed sloped walls 28 and 29 and with the leading end of each spline being inclined, as indicated at 30, to form a cam member having a cam surface.

The internal recess 22 of the handle has a series of elongate, inwardly-extending splines 40 which are shaped and spaced to interfit with the splines 27 on the operating shaft. As shown in FIG. 2, there are upper and lower groups of the splines 40 and with there being a pair of recessed channels 50 and 51 formed in the interior of the handle for reception of a spring member, indicated generally at 55.

The spring member 55 is formed of a strip of spring material and is generally of a U-shape to have a central base 56 and a pair of arms 57 and 58. The spring member is fixed to the handle by staking die cast material of the handle on each side of the central base 56 of the spring and as shown at 60 and 61. Each of the arms 57 and 58 is formed with a generally V-shaped hook portion 65 and 66, respectively, and having a free end 67 and 68, respectively.

Each of the hook portions is of the same construction and as shown particularly in FIG. 6 the hook portion 65 has a pair of legs 70 and 71 which are inclined and which are of a slightly different slope. The leg 71 is at a slope of approximately 15° from the vertical, as viewed in FIG. 6, and coacts with the surface 29 of the detent notch for retention of the hook portion within the detent notch. The leg 70 has a slope of approximately 30° from the vertical and primarily functions as a cam member coacting with a cam member 30 on a shaft spline to cam the spring member arm outwardly as the handle is being placed on the operating shaft.

The free ends 67 and 68 of the spring member arms diverge outwardly from the hook portions 65 and 66, respectively, to engage the interior wall of the handle recess and resist forces tending to cause outward movement of the spring member hook portions relative to the detent notches.

The relation between the arms 57 and 58 of the spring member and the splines 40 of the handle is shown particularly in FIG. 3 where it will be noted that the leading ends of the splines 40 are closely adjacent the free ends 67 and 68 of the spring members and in advance of the hook portions 65 and 66. With this relation, it is possible to rotatably locate the handle for initial interfitting of the splines prior to engagement of the hook portions with the cam member surfaces 30 on the operating shaft whereby the handle can be inserted with one continuous motion after this initial orientation.

With the structure described, the handle is placed in general alignment with the operating shaft and with initial advance of the handle onto the shaft causing interengagement of the splines 27 and 40 with some small amount of handle rotation being made, if necessary, to obtain interfitting alignment of the splines. The handle is then advanced onto the operating shaft a distance to have the hook legs 70 engage the cam surfaces 30. Further advance of the handle causes a coaction between these members to spread the spring member arms 57 and 58 apart against the inherent resistance of the spring member as well as engagement of the free ends 67 and 68 with the wall of the recess. Further advance of the handle then causes the lock portions 65 and 66 to snap into the detent notches where the legs 71 of the lock portions engage against the detent surfaces 29 of two of the splines 27 to retain the handle on the operating shaft. For all practical purposes, the handle is permanently attached to the operating shaft and with torque created by rotation of the handle being transmitted through the torque-transmitting connection by the splines and without applying forces to the spring member. If necessary to remove the handle, a strong pull thereof will enable release of the handle by the small degree of camming action of the legs 71 against the detent surfaces 29 and against the opposition of the spring structure.

I claim:

1. A snap-on handle structure including a handle with an internal recess and an operating shaft with a series of raised splines each having a sloped end to form a cam surface and a detent notch intermediate the ends thereof, a generally U-shaped spring member secured to the handle and positioned in said recess with a pair of spaced-apart arms with outwardly diverging free ends extending toward an open end of the recess, each of said arms having a generally V-shaped hook portion spaced from said free ends to define a pair of inclined legs engageable in a pair of said detent notches, one of said legs of each pair acting to hold said handle on the shaft against removal and the other leg of each pair engaging said cam surface on a spline to deflect said hook portion as the handle is placed on the shaft.

2. A handle as defined in claim 1 wherein said hook portion legs are of different slope with said one leg having the lesser slope to resist pull off of the handle from the shaft and minimize the force acting to move the hook portion out of the detent notch, and said free ends engaging the wall of the recess to assist in holding the hook portion in the detent notch.

3. A handle as defined in claim 1 including raised splines in the handle recess to fit with the shaft splines, and said handle splines having their leading ends positioned a sufficient distance closer to the open end of the recess than said hook portions to effect spline interengagement prior to engagement of the hook portions with the cam surfaces.

4. A snap-on handle structure including a handle with an internal recess having a wall, an operating shaft with detent notches and a sloped cam surface with the latter disposed adjacent an end of the operating shaft, and a generally U-shaped spring member secured to said handle and positioned in said recess with a pair of spaced-apart arms with outwardly diverging free ends extending toward an open end of the recess and engaging said wall, each of said arms having a generally V-shaped hook portion spaced from said free ends and spaced from said recess wall to define a pair of inclined legs engageable in a pair of said detent notches, one of said legs engaging said cam surface to deflect said arms and the hook portions outwardly toward said wall as the handle is placed on the shaft and the other of said legs engaging the detent notch to hold the handle on the shaft against removal and with said free ends still outwardly diverging after handle placement on the shaft.

5. A handle as defined in claim 4 wherein said operating shaft and handle have torque-transmitting connecting parts, said parts being interengaged prior to engagement of the spring member with the cam surface for handle placement in one continuous motion.

* * * * *